US010126047B2

(12) United States Patent
Watanabe et al.

(10) Patent No.: US 10,126,047 B2
(45) Date of Patent: Nov. 13, 2018

(54) POWER-CONSUMPTION OUTPUT DEVICE (71) Applicant: Toshiba Lifestyle Products & Services Corporation, Ome-shi, Tokyo (JP)

(72) Inventors: Kota Watanabe, Ome (JP); Kazuhiro Furuta, Ome (JP); Yuki Takahashi, Ome (JP); Yuuki Marutani, Ome (JP)

(73) Assignee: TOSHIBA LIFESTYLE PRODUCTS & SERVICES CORPORATION, Tokyo (JP)

( * ) Notice: Subject to any disclaimer, the term of this patent is extended or adjusted under 35 U.S.C. 154(b) by 309 days.

(21) Appl. No.: 15/053,520

(22) Filed: Feb. 25, 2016

(65) Prior Publication Data

US 2016/0169577 A1 Jun. 16, 2016

Related U.S. Application Data

(63) Continuation of application No. PCT/JP2014/068052, filed on Jul. 7, 2014.

(30) Foreign Application Priority Data

Aug. 26, 2013 (JP) .................................. 2013-174493

(51) Int. Cl.
*G05D 9/00* (2006.01)
*F25D 29/00* (2006.01)
(Continued)

(52) U.S. Cl.
CPC ............. *F25D 29/00* (2013.01); *G05B 15/02* (2013.01); *G05F 1/66* (2013.01); *F25B 2600/07* (2013.01);
(Continued)

(58) Field of Classification Search
CPC . F25D 29/00; G05F 1/66; G05B 15/02; Y04S 20/40; Y04S 20/244; Y04S 20/242;
(Continued)

(56) References Cited

U.S. PATENT DOCUMENTS 7,409,258 B2 * 8/2008 Huang ................. G06Q 10/087
700/102
D672,666 S 12/2012 Rhodes
(Continued)

FOREIGN PATENT DOCUMENTS

CN 1874105 12/2006
CN 101368985 A 2/2009
(Continued)

OTHER PUBLICATIONS

Korean Office Action (with English Translation) issued in KR 10-2016-7004650 dated Apr. 13, 2017.
(Continued)

*Primary Examiner* — Vu A Vu
(74) *Attorney, Agent, or Firm* — DLA Piper LLP US (57) ABSTRACT

A power consumption output device is provided with a power consumption information acquiring unit and an output unit. The power consumption information acquiring unit is configured to acquire power consumption information indicating power consumption of a home appliance. The output unit is configured to output the power consumption of the home appliances along with a reference value. The power consumption of the home appliance is obtained based on the power consumption information acquired by the power consumption information acquiring unit.

16 Claims, 7 Drawing Sheets

(51) Int. Cl.
*G05B 15/02* (2006.01)
*G05F 1/66* (2006.01)
*H02J 13/00* (2006.01)
*G01D 4/02* (2006.01)

(52) U.S. Cl.
CPC ............ *G01D 4/02* (2013.01); *H02J 13/0075* (2013.01); *Y02B 30/765* (2013.01); *Y02B 70/3266* (2013.01); *Y02B 70/3275* (2013.01); *Y02B 90/245* (2013.01); *Y02B 90/2653* (2013.01); *Y04S 20/242* (2013.01); *Y04S 20/244* (2013.01); *Y04S 20/40* (2013.01); *Y04S 40/126* (2013.01)

(58) Field of Classification Search
CPC . Y04S 40/126; Y02B 90/245; Y02B 90/2653; Y02B 70/3275; Y02B 70/3266; Y02B 30/765; G01D 4/02; F25B 2600/07; H02J 13/0075
USPC ........................................................ 700/291
See application file for complete search history.

(56) References Cited

U.S. PATENT DOCUMENTS

| | | |
|---|---|---|
| D699,130 S | 2/2014 | Rhodes |
| 2006/0090482 A1 | 5/2006 | Dawes |
| 2006/0123807 A1 | 6/2006 | Sullivan |
| 2008/0195237 A1 | 8/2008 | Mukaigawa |
| 2010/0070091 A1 | 3/2010 | Watson et al. |
| 2010/0070099 A1 | 3/2010 | Watson et al. |
| 2010/0070434 A1 | 3/2010 | Cooper et al. |
| 2010/0089909 A1 | 4/2010 | Besore et al. |
| 2010/0090806 A1 | 4/2010 | Schork et al. |
| 2010/0092625 A1 | 4/2010 | Finch et al. |
| 2010/0094470 A1 | 4/2010 | Besore et al. |
| 2010/0101254 A1 | 4/2010 | Besore et al. |
| 2010/0121499 A1 | 5/2010 | Besore et al. |
| 2010/0146712 A1 | 6/2010 | Finch et al. |
| 2010/0174668 A1 | 7/2010 | Finch et al. |
| 2010/0175719 A1 | 7/2010 | Finch et al. |
| 2010/0179708 A1 | 7/2010 | Watson et al. |
| 2010/0187219 A1 | 7/2010 | Besore et al. |
| 2011/0098869 A1* | 4/2011 | Seo ................. G01D 4/004 700/296 |
| 2011/0175742 A1* | 7/2011 | Shin ................ F25D 17/065 340/635 |
| 2012/0004871 A1* | 1/2012 | Tsao ................ G01R 19/2513 702/61 |
| 2012/0017630 A1 | 1/2012 | Okabe |
| 2012/0017628 A1 | 7/2012 | Drew |
| 2012/0176252 A1 | 7/2012 | Drew et al. |
| 2012/0316693 A1 | 12/2012 | Ogawa |
| 2013/0067375 A1 | 3/2013 | Kim et al. |
| 2013/0103222 A1 | 4/2013 | Watson et al. |
| 2013/0162024 A1* | 6/2013 | Tumback ......... F02N 11/0825 307/9.1 |
| 2013/0274944 A1* | 10/2013 | Park ................. H02J 3/14 700/295 |
| 2013/0307698 A1 | 11/2013 | Park et al. |
| 2016/0239179 A1 | 8/2016 | Kim et al. |

FOREIGN PATENT DOCUMENTS

| | | |
|---|---|---|
| CN | 101368985 B | 10/2012 |
| JP | H10-123185 | 5/1998 |
| JP | H11-337252 | 12/1999 |
| JP | 2002-147932 | 5/2002 |
| JP | 2006-190145 | 7/2006 |
| JP | 2007-014179 | 1/2007 |
| JP | 2009-020721 | 1/2009 |
| JP | 4346584 | 10/2009 |
| JP | 2010-014323 | 1/2010 |
| JP | 4682414 | 5/2011 |
| JP | 2012-052793 | 3/2012 |
| JP | 2012-133763 | 7/2012 |
| TW | M360365 | 7/2009 |
| TW | 201019562 | 5/2010 |
| TW | 201033559 | 9/2010 |
| TW | M408027 | 7/2011 |
| TW | 201135169 | 10/2011 |
| TW | 201203770 | 1/2012 |
| TW | 201322579 | 6/2013 |
| TW | 201333869 | 8/2013 |
| WO | WO 2012/093903 | 7/2012 |

OTHER PUBLICATIONS

Extended European Search Report issued in EP 14839818.3 dated Apr. 28, 2017.
Taiwanese Office Action issued in TW 103124652 dated Apr. 27, 2017.
English language abstract and machine translation of JP 4682414 published May 11, 2011.
English language abstract and machine translation of JP 4346584 published Oct. 21, 2009.
English language abstract and machine translation of JP 2002-147932 published May 22, 2002.
English language abstract and machine translation of WO 2012/093903 published Jul. 12, 2012.
Chinese Office Action (with English Translation) issued in CN Application No. 201480047757.4 dated Dec. 2, 2016.
English language abstract and machine translation of CN 1874105 published Dec. 6, 2006.
International Search Report issued in PCT/JP2014/068052 dated Sep. 9, 2014.
Taiwanese Office Action issued in TW 103124652 dated Mar. 25, 2016 with English language translation.
English language Abstract and machine Translation of JP H11-337252 published Dec. 10, 1999.
English language Abstract and machine Translation of JP 2009-020721 published on Jan. 29, 2009.
English language Abstract and machine Translation of JP 2010-014323 published on Jan. 21, 2010.
English language Abstract and machine Translation of JP 2007-014179 published on Jan. 18, 2007.
English language Abstract and machine Translation of JP 2006-190145 published on Jul. 20, 2006.
English language Abstract and machine Translation of JP H10-123185 published on May 15, 1998.
English language Abstract and machine Translation of JP 2012-052793 published on Mar. 15, 2012.
English language Abstract of TW 201322579 published Jun. 1, 2013.
English language Abstract and machine translation of CN 101368985 A published Feb. 18, 2009.
English language Abstract and machine translation of CN 101368985 B published Oct. 10, 2012.
English language Abstract and machine translation of TW 201033559 published on Sep. 16, 2010.
English language Abstract and machine translation of JP 2012-133763 published on Jul. 12, 2012.
English machine translation of M360365 published on Jul. 1, 2009.
English language Abstract and machine translation of TW 201135169 published on Oct. 16, 2011.
English language Abstract and machine translation of TW 201019562 published on May 16, 2010.
English language Abstract and machine translation of TW M408027 published on Jul. 21, 2011.
English language Abstract and machine Translation of TW 201203770 published on Jan. 16, 2012.
English language Abstract and machine Translation of TW 201333869 published on Aug. 16, 2013.
Taiwanese Office Action issued in TW 103124652 dated Sep. 12, 2016 with English language translation.

(56) References Cited

OTHER PUBLICATIONS

Japanese Office Action issued in JP 2013-174493 dated Oct. 4, 2016 with English language translation.
Chinese Office Action issued in CN Application No. 201480047757.4 dated Aug. 3, 2017.
Japanese Office Action (with English Language Translation) issued in JP 2013-174493 dated May 30, 2017.

* cited by examiner

POWER-CONSUMPTION OUTPUT DEVICE

CROSS-REFERENCE TO RELATED APPLICATION(S)

This application is a continuation to an International Application No. PCT/JP2014/068052, filed on Jul. 7, 2014 which is based upon and claims the benefit of priority from Japanese Patent Application No. 2013-174493, filed on, Aug. 26, 2013 the entire contents of which are incorporated herein by reference.

FIELD

Embodiments disclosed herein relate to a power consumption output device.

BACKGROUND

Conventionally, technologies for displaying the amount of electric power consumption of home appliances have been conceived.

However, a refrigerator, which is one example of a home appliance, is constantly energized and thus, its electric power consumption may vary significantly depending upon usage. As such, it is difficult for the user to judge whether electric power consumption is appropriate, too high, or too low when the current electric power consumption is simply presented to the user. It is thus, not possible to improve user's energy saving mindset.

Embodiments disclosed herein provide a power consumption output device capable of effectively improving the user's energy saving mindset.

DESCRIPTION

In one embodiment, a power consumption output device is provided with a power consumption information acquiring unit and an output unit. The power consumption information acquiring unit is configured to acquire power consumption information indicating power consumption of a home appliance. The output unit is configured to output the power consumption of the home appliance along with a reference value. The power consumption of the home appliance is obtained based on the power consumption information acquired by the power consumption information acquiring unit.

A description will be given hereinafter on one embodiment pertaining to a power consumption output device with reference to the accompanying drawings.

Figure 1:
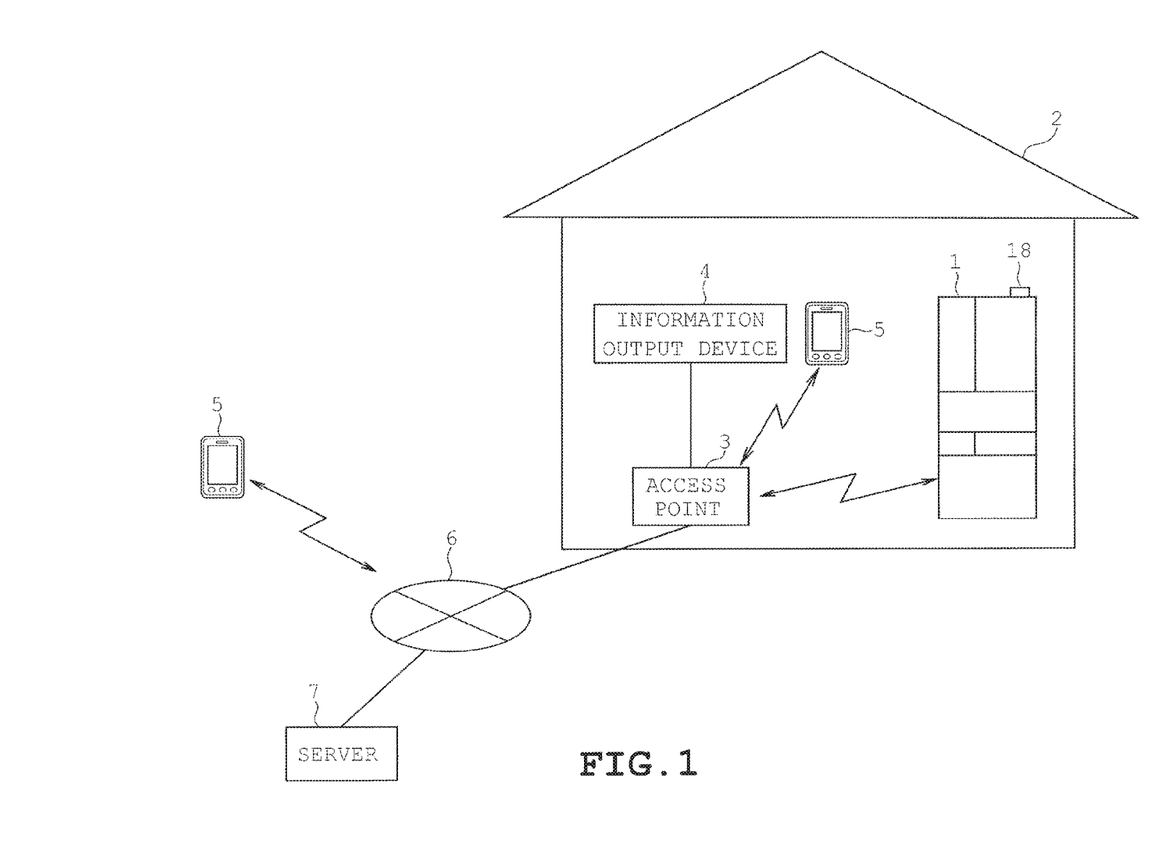
FIG. 1 pertains to one embodiment and schematically illustrates a system including a power consumption output device.

As illustrated in FIG. 1 for example, a refrigerator 1 being one example of a home appliance, is installed in a residence 2. The refrigerator 1 is configured to be capable of communicating with an information output device 4 and a mobile terminal 5. The information output device 4 is one example of the power consumption output device. A wireless communication is exchanged between the refrigerator 1 and the access point 3 through a communication adaptor 18 provided at the upper portion of the refrigerator 1. Through the access point 3, the refrigerator 1 is further capable of communicating with the mobile terminal 5 and a server 7, etc. connected to an external network 6. The information output device 4 is configured by a personal computer for example and establishes wire/wireless connection with the access point 3.

Examples of the mobile terminal 5 envisaged in the present embodiment include a highly functional mobile phone known as a smart phone and a tablet PC. When the mobile terminal 5 is located inside a residence 2, the mobile terminal 5 is communicably connected to the access point 3 by a close-range wireless communication. When the mobile terminal 5 is located outside the residence 2, the mobile terminal 5 is communicably connected to the access point 3 by a wide-range wireless communication byway of external network 6. The mobile terminal 5 is further capable of connecting to the access point 3 byway of the external network 6 through wide-range communication even when located inside of the residence 2. The mobile terminal 5 located inside the residence 2 is further capable of communicating directly with the refrigerator 1 without the intervention of the access point 3. In the present embodiment, a wireless LAN communication, a Bluetooth (registered trademark in Japan) wireless communication, etc. are exchanged between the mobile terminal 5 and the refrigerator 1, between the mobile terminal 5 and the access point 3, and between the refrigerator 1 and the access point 3. The server 7 is configured by a computer system known in the art. The server 7 stores various information for accessing the refrigerator 1 and is configured to be capable of delivering such information. Examples of information for accessing the refrigerator 1 include an IP address.

Figure 2:
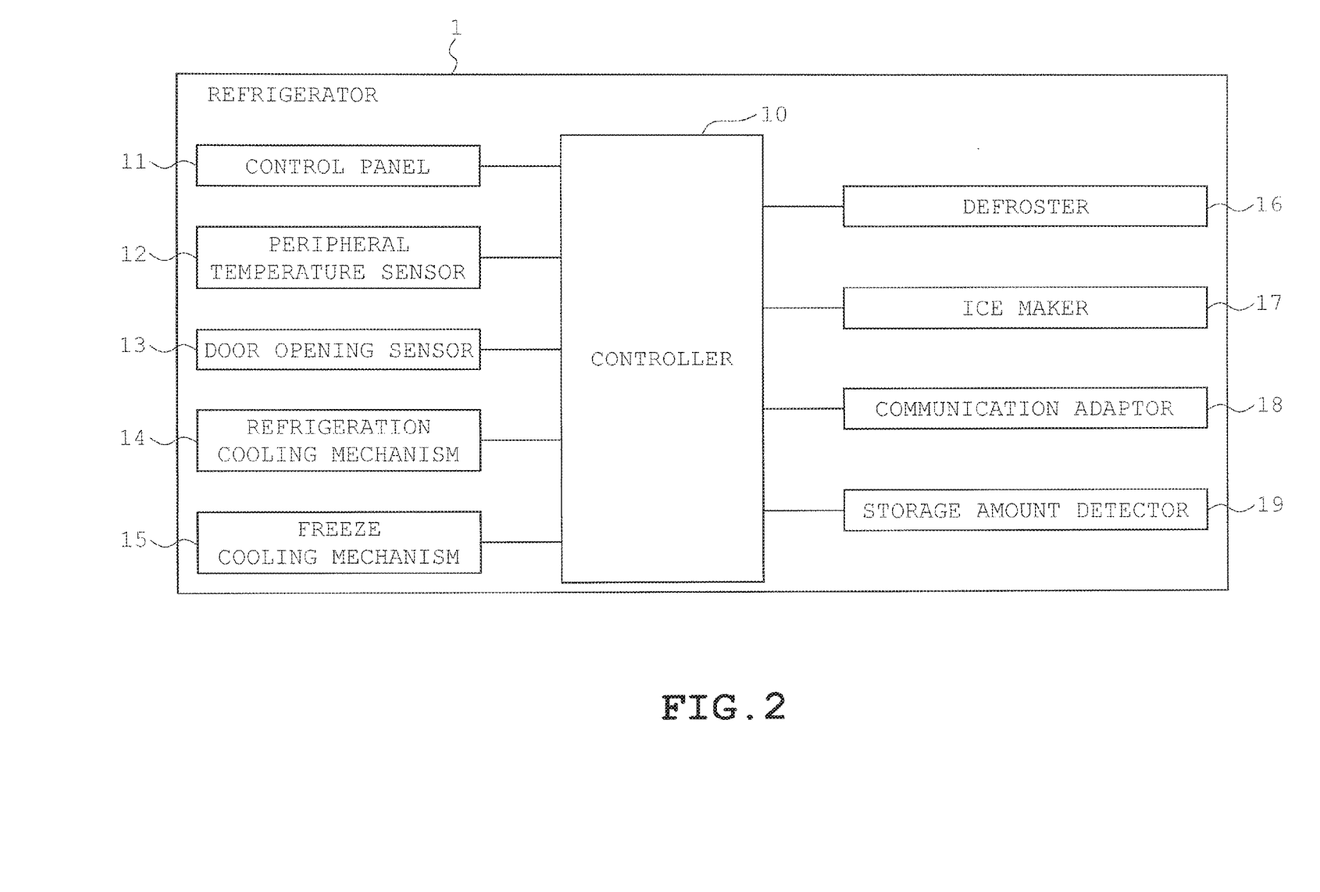
FIG. 2 schematically illustrates the structure of a refrigerator which is one example of a home appliance.

Next, a description will be given on one example of a structure of the refrigerator 1. The refrigerator 1 is provided with multiple storage chambers such as a refrigeration chamber, a vegetable chamber, an ice maker chamber, and a freezer chamber. As illustrated in FIG. 2 for example, a controller 10 responsible for controlling the overall operation of the refrigerator 1 based on a control program is provided inside the refrigerator 1. The controller 10 is connected to a control panel 11, a peripheral temperature sensor 12, a door opening sensor 13, a refrigeration cooling mechanism 14, a freeze cooler mechanism 15, a defrost mechanism 16, an ice maker device 17, a communication adaptor 18, a storage amount detection device 19, etc.

The controller 10 is responsible for the overall control of the refrigerator 1 based on operation signals inputted from the control panel 11 in response to user operation. The controller 10 is further configured to detect the temperature of the periphery of the refrigerator 1 through the peripheral temperature sensor 12 which is one example of a peripheral temperature detecting unit. The controller 10 is further capable of detecting the opened/closed status of the door by the door opening sensor 13 based on which is turned ON/OFF when the doors of the storage chambers such as the refrigeration chamber, vegetable chamber, ice maker chamber, and the freezer chamber are opened/closed. It is further possible to detect the time period in which the door is opened or closed through a timer not illustrated by counting the time period in which the door opening sensor 13 is turned ON or OFF.

The refrigeration cooler mechanism 14 is provided with a refrigeration cycle known in the art including the refrigeration cooler, etc. not illustrated. The refrigeration cooler mechanism 14 is configured to feed cool air into the storage chambers specified to the refrigeration temperature zone depending upon the drive signal inputted from the controller 10. The freeze cooling mechanism 15 is provided with a refrigeration cycle known in the art including the freeze cooler, etc. not illustrated. The freeze cooler mechanism 15 is configured to feed cool air into the storage chambers specified to the freeze temperature zone depending upon the drive signal inputted from the controller 10.

A storage amount detector 19 is one example of a storage amount detecting unit and is configured to detect the amount of food, etc. stored in the storage chamber. In this example, the storage amount detector 19 is provided with an optical sensor known in the art which is disposed inside the storage chamber. The storage amount detector 19 makes a judgement that amount of storage inside the chamber is small when illuminance inside the chamber detected by the optical sensor is high and a judgement that amount of storage inside the chamber is large when illuminance inside the chamber detected by the optical sensor is low. In this example, the storage amount detector 19 is configured to judge the level of storage amount of food, etc. inside the fridge in the scale of ten levels ranging from 10% to 100% depending upon the illuminance inside the chamber detected by the optical sensor.

The refrigerator 1 is capable of specifying location information for identifying the location where it is installed. For example, the controller 10 is configured to store and retain the location information specified when installing the refrigerator 1 into a recording medium such as a memory not illustrated. It is possible to specify such location information by, for example, inputting the address of the location, the coordinate information such as longitude and latitude of the location, or the name of the district of the location.

A defroster 16 is provided to melt away the frost developed on the coolers of the refrigeration cooling mechanism 14 and the freeze cooling mechanism 15. The defroster 16 is provided with a heater that produces heat by a supply of electricity. Power consumption increases compared to normal operation when defrost operation of the defroster 16 is started as electricity is supplied to the heater. Ice maker 17 is configured to supply water to the ice maker carton not illustrated. The ice maker 17 is configured to detect the water temperature indirectly by detecting the temperature of the ice maker carton. The ice maker carton operates in the refrigeration cycle in the ice making mode until a judgement is made that water has frozen. When judging that water has frozen, the ice maker carton is turned to store the ice inside the ice box. When the ice maker 17 starts the ice making operation, the operation of the refrigeration cycle is switched to the ice making mode and components such as a water feed motor not illustrated are driven and thus, increases power consumption compared to normal operation.

The communication adaptor 18 is capable of communicating with the information output device 4, the mobile terminal 5, and the like located inside the residence 2 through the access point 3. The communication adaptor 18 is further capable of communicating with the mobile terminal 5, the server 7, and the like located outside the residence 2 through the access point 3 and the internet 6. The controller 10 is capable of transmitting information such as various information pertaining to the refrigerator 1 to external devices such as the information output device 4 and the server 7 through the communication adaptor 18.

Information being provided to the information output device 4 from the refrigerator 1 include, for example, power consumption information indicating the power consumption of the refrigerator 1; model information identifying the model of the refrigerator 1; operational status information indicating the operational status of the refrigerator 1; setting information indicating the current settings applied to the refrigerator 1; and the location information described earlier. The operational status information include, for example, defrost history information indicating the presence/absence of defrost operation of the cooler by the defroster 16; door opening-closing count information indicating the count of door opening-closing; peripheral temperature information indicating the peripheral temperature of the refrigerator 1; storage amount information indicating the storage amount inside the chamber detected by the storage amount detector 19, and the like that provide various information pertaining to the operational status of the refrigerator 1.

Figure 3:
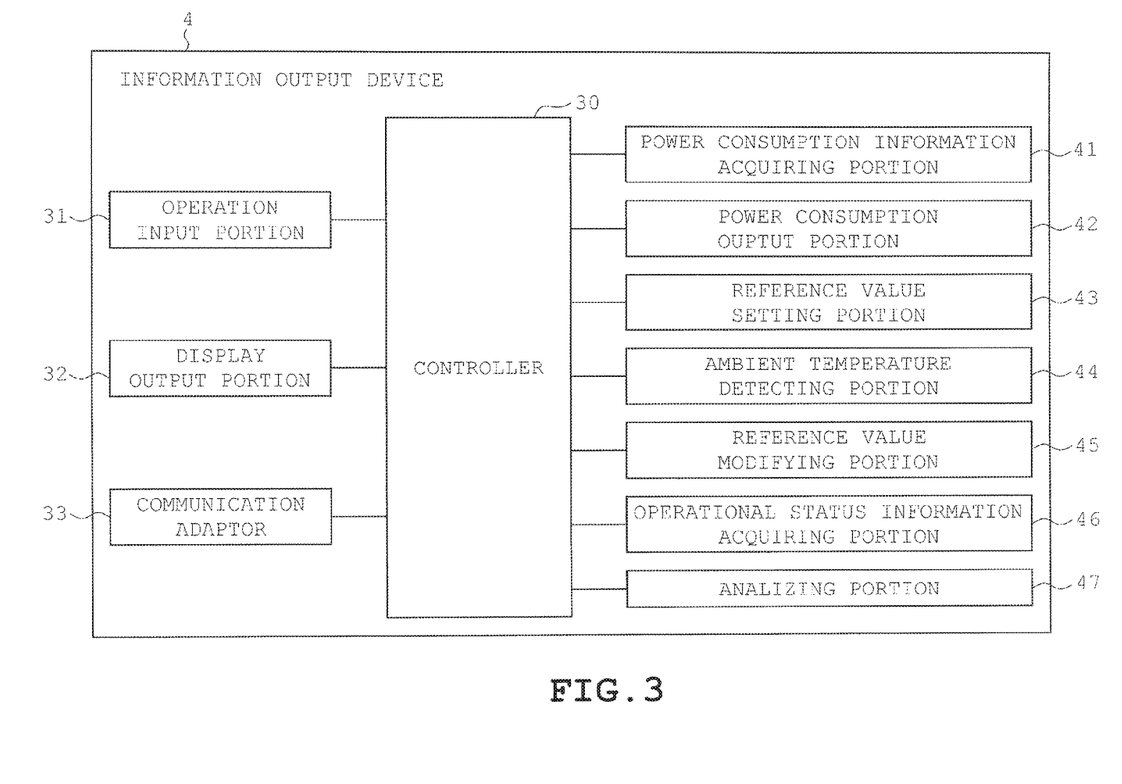
FIG. 3 schematically illustrates one example of a structure of the power consumption output device.

Next, a description will be given on one example of the configuration of the information output device 4. For example, a controller 30 is provided inside the information output device 4 as illustrated in FIG. 3. The controller 30 is configured to control the overall operation of the information output device 4 based on a control program. The controller 30 is connected to an operation input portion 31, a display output portion 32, and a communication adaptor 33. The operation input portion 31 is configured by, for example, a touch panel switch provided on the screen of the display output portion 32 and mechanical operation switches provided around the display output portion 32. The display output portion 32 is configured, for example, by a liquid crystal display panel. The communication adaptor 33 is capable of communicating with the refrigerator 1 and mobile terminal 5 located inside the residence 2 through the access point 3. The communication adaptor 33 is further capable of communicating with the mobile terminal 5 and the server 7 located outside the residence 2 through the access point 3 and the internet 6.

The controller 30 virtually implements power consumption information acquiring portion 41, power consumption output portion 42, reference value setting portion 43, ambient temperature detecting portion 44, reference value modifying portion 45, operational status information acquiring portion 46, and analyzing portion 47 through execution of a control program by the CPU. These processing portions 41 to 47 maybe implemented by hardware such as an integrated circuit.

The power consumption information acquiring portion 41 is one example of a power consumption information acquiring unit and acquires power consumption information from the refrigerator 1 through the adaptor 33 when required. The power consumption information indicates the amount of electric power currently being consumed by the refrigerator 1. The controller 30 stores the acquired power consumption information with acquisition time information identifying the time when the information was acquired. The acquisition time information is produced by time information given by a timer not illustrated provided at the information output device 4. The acquisition time information carries enough detail to, for example, identify the year, month, and date of acquisition. Power consumption information obtained from time to time from the refrigerator 1 is thus, stored in the information output device 4. The controller 30 is thus, capable of identifying the power consumption of the refrigerator 1 at a first prescribed time period from the present such as 1 week, 1 month, and 1 year based on the stored power consumption information. The first prescribed time period may be modified as required. The power consumption information acquiring portion 41 is capable of acquiring and storing power consumption of refrigerators not illustrated besides refrigerator 1.

The power consumption output portion 42 is one example of an output unit and is configured to display, to the display output portion 32, power consumption of the refrigerator 1 along with a reference value providing a standard based on the power consumption information acquired by the power consumption information acquiring portion 41.

The power consumption output portion 42 is further capable of displaying, to the display output portion 32, cumulative power consumption along with a reference value. The cumulative power consumption is an accumulation of power consumption indicated in the power consumption information obtained by the power consumption information acquiring portion 41 from time to time in a second prescribed time period from the present. That is, the power consumption output portion 42 is capable of displaying a cumulative amount of electric power consumed by the refrigerator 1 in a second prescribed time period from the present. The second prescribed time period, being variable, is basically shorter than the first prescribed time period. For example, settings may be made so that the power consumption output portion 42 is capable of displaying cumulative power consumption of the refrigerator 1 in the past day, that is, within 24 hours.

The power consumption output portion 42 is further capable of displaying, to the display output portion 32, cumulative power consumption of the day before along with a reference value. Again, the cumulative power consumption is an accumulation of power consumption indicated in the power consumption information obtained by the power consumption information acquiring portion 41 from time to time. That is, the power consumption output portion 42 is capable of displaying a cumulative amount of electric power consumed by the refrigerator 1 in the day before. For example, settings may be made so that the power consumption output portion 42 is capable of displaying the cumulative power consumption of the refrigerator 1 within 1 day, i.e. 24 hours or less from the present. The power consumption output portion 42 is capable of displaying the cumulative power consumption of the refrigerator 1 in the range of 0:00 to 24:00 in 1 calendar day before the present day.

A reference value setting portion 43 is one example of a reference value setting unit and is configured to set a reference amount of electric power consumed by the refrigerator 1 on the display output portion 32 along with the actual cumulative amount of electric power consumed. The reference value may be set in various ways.

When power consumption information for multiple refrigerators 1 including the refrigerator 1 has been acquired by the power consumption information acquiring portion 41, the reference value setting portion 43 is capable of calculating an average power consumption of the multiple refrigerators based on the multiple pieces of power consumption information and set the average value as the reference value. When model information is appended to the acquired power consumption information, the reference value setting portion 43 is capable of identifying the model of each refrigerator based on the model information and providing an average value for the refrigerators of the same type. The reference value setting portion 43 may be configured to calculate an average value of only a group of refrigerators of the same model as the refrigerator 1.

When location information is appended to the acquired power consumption information, the reference value setting portion 43 is capable of identifying the refrigerators located in the prescribed region based on the location information and providing an average value for the refrigerators located in the prescribed regions. The reference value setting portion 43 may be configured to calculate an average value of only a group of refrigerators located in the same region as the refrigerator 1.

The reference value setting portion 43 is further capable of setting, as the reference value, the power consumption indicated in the power consumption information acquired by the power consumption information acquiring portion 41 at first prescribed period ago from the present.

The ambient temperature detecting portion 44 is one example of an ambient temperature detecting unit and is configured to detect ambient temperature by a temperature sensor not illustrated provided to the information output device 4. The ambient temperature detecting portion 44 is configured to output ambient temperature information indicating the detected temperature to the controller 30. The "ambient temperature" denotes the temperature outside the information output device 4 and may indicate the temperature inside or outside the residence 2 as long as the temperature pertains to the outside of the information output device 4. It is possible to detect temperatures of various locations outside the information output device 4 by changing the location where the temperature sensor not illustrated is installed inside or outside the residence 2.

A reference value modifying portion 45 is one example of a reference value modifying unit and is configured to modify the reference value set by the reference value setting portion 43 based on the ambient temperature detected by the ambient temperature detecting portion 44. The reference value modifying portion 45 increases the reference value by a prescribed amount when the ambient temperature is higher than a prescribed value. The reference value modifying portion 45 reduces the reference value by a prescribed amount when the ambient temperature is lower than a prescribed value. The prescribed value and the prescribed amount used in the modification are variable.

An operational state information acquiring portion 46 is one example of an operational state information acquiring unit and is configured to acquire operational status information indicating the operational status of the refrigerator 1 through the communication adaptor 33. The power consumption output portion 42 is capable of displaying the operational status indicated in the operational status information to the display output portion 32 along with power consumption and reference value when the operational status information has been obtained by the operational state information acquiring portion 46. The operational status information acquiring portion 46 is capable of acquiring operational status information indicating the operational status of the refrigerator from refrigerators other than the refrigerator 1.

An analyzing portion 47 is one example of an analyzing unit 47 and is configured to analyze the cause of change encountered in the power consumption outputted by the power consumption output portion 42. The analyzing portion 47 is configured to analyze the cause of change in the power consumption outputted by the power consumption output portion 42 when abnormal change is observed in the power consumption such as a significant increase in a short period of time and significant increase compared to similar time of year in the year before. For example, when the present power consumption is greater than the power consumption in the similar time of year of the year before by a prescribed amount of 0.2 kWh or more, the analyzing portion 47 verifies the operational state of the refrigerator 1 based on the operational status information obtained from the refrigerator 1. The analyzing portion 47 is configured to produce message data reading, for example, "The fridge interior is not cooled well because of excessive storage. Try organizing the stored items in the fridge. Stay alert on the count of door opening-closing".

The information output device 4 is capable of outputting power consumption of the refrigerator 1, being one example of a home appliance, along with a reference value. Different modes for outputting power consumption will be described through examples given herein.

Figure 4:
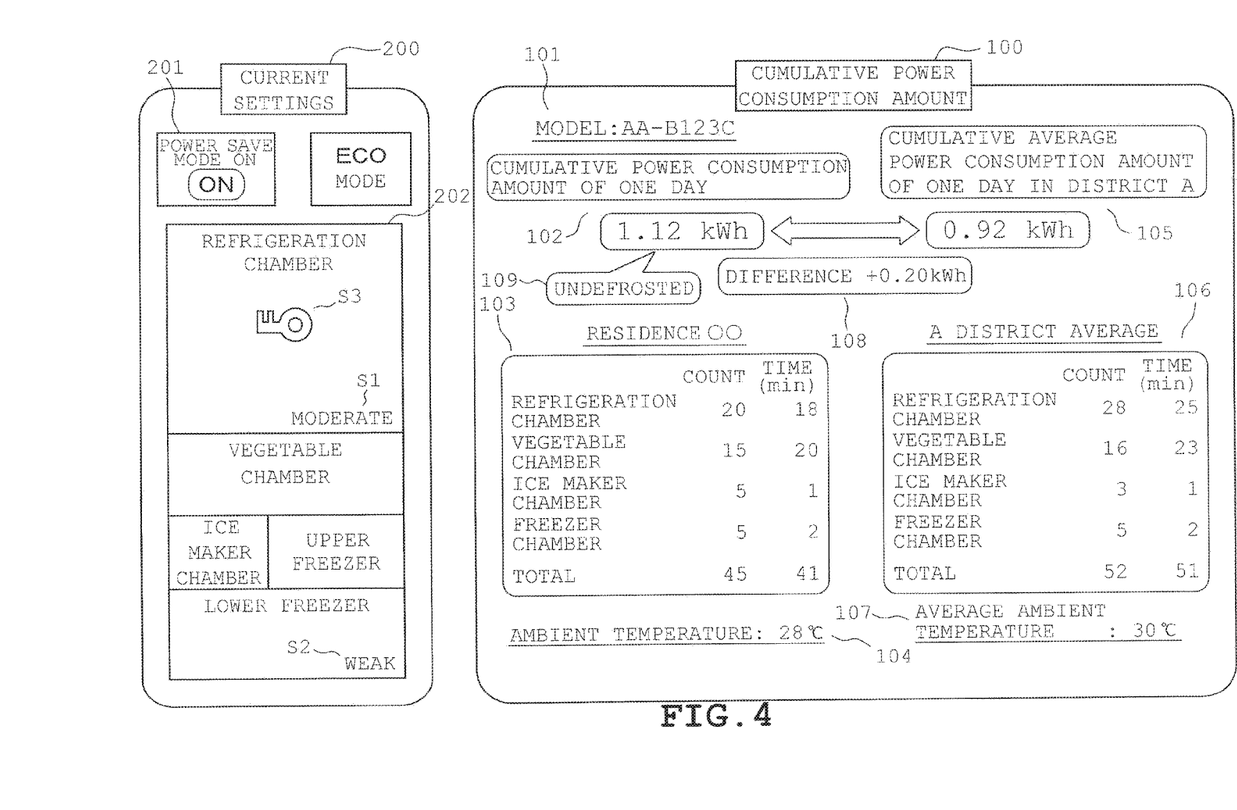
FIG. 4 illustrates one example of an output screen of the power consumption output device.

FIG. 4 illustrates one example of a power consumption output screen. The power consumption output screen is provided with a power consumption display section 100 and applied settings display section 200. The power consumption display section 100 displays current amount of power consumption of the refrigerator 1 and a reference value. The applied settings display section 200 displays the settings currently being applied to the refrigerator 1.

The power consumption display section 100 displays variety of information pertaining to the refrigerator 1 based on various information such as power consumption information and operational status information obtained from the refrigerator 1. For example, the power consumption display section 100 illustrated in FIG. 4 is provided with: a model block 101 for displaying the name of the model of the refrigerator 1; a power consumption block 102 for displaying the power consumption of the refrigerator 1; an operational status block 103 for displaying the operational status of the refrigerator 1; and ambient temperature block 104 for displaying the ambient temperature of the refrigerator 1. The power consumption block 102 displays cumulative power consumption within 1 day from the present, that is, within 24 hours, meaning that cumulative power consumption of the refrigerator 1 of the past 1 day is displayed.

The power consumption displayed in the power consumption block 102 is displayed in the unit of "kWh".

The power consumption display section 100 is further provided with an average power consumption block 105, an average operational status block 106, and an average ambient temperature block 107. The average power consumption block 105 displays the average power consumption of a group of multiple refrigerators located in region A where the refrigerator 1 is located which serves as a reference value. The average operational status block 106 displays the average operational status of a group of multiple refrigerators located in region A where the refrigerator 1 is located. The average ambient temperature block 107 displays the average ambient temperature of a group of multiple refrigerators located in region A where the refrigerator 1 is located. The average power consumption block 105 displays average cumulative power consumption within 1 day or 24 hours from the present for a group of multiple refrigerators including refrigerator 1 in region A. That is, an average cumulative power consumption of the past 1 day in region A for a group of multiple refrigerators is displayed as a reference value. The power consumption displayed in the average power consumption block 105 is displayed in the unit of "kWh".

The power consumption display section 100 is further provided with power consumption difference block 108 and a defrost operation block 109, etc. The power consumption difference block 108 displays the difference between power consumption of the refrigerator 1 displayed in the power consumption block 102 and the average power consumption displayed in the average power consumption block 105. The defrost operation block 109 displays the presence/absence of defrost operation in the refrigerator 1. The power consumption displayed in the power consumption difference block 108 is displayed in the unit of "kWh". Character information which may read "defrosted" is displayed in the defrost operation block 109 when there is a history of performing the defrost operation within a prescribed period from the present, for example, in the past 1 day. Character information which may read "undefrosted" is displayed in the defrost operation block 109 when there is no history of performing the defrost operation within a prescribed period from the present.

The applied settings display section 200 displays the settings currently applied to the refrigerator 1 based on the settings information obtained from the refrigerator 1. As illustrated in FIG. 4 for example, the applied settings display section 200 is provided with a power save block 201 and refrigerator block 202, etc. The power save block 201 displays whether or not the refrigerator 1 is set to the power save mode. When the refrigerator 1 is set to the power save mode, character information that may read "ON" is displayed to the power save block 201. When the refrigerator 1 is not set to the power save mode, on the other hand, character information that may read "OFF" is displayed to the power save block 201.

The refrigerator block 202 displays items such as the cooling level set to each of the storage chambers of the refrigerator 1 and whether or not any of the settings made to each of the chambers are locked. In the example illustrated in FIG. 4, symbols S1, S2, and S3 are displayed where: symbol S1 indicates that the cooling level of the refrigeration chamber is set to medium; symbol S2 indicates that the cooling level of the lower freezer chamber is set to low; and symbol S3 indicates that settings pertaining to the refrigeration chamber are locked.

Figure 5:
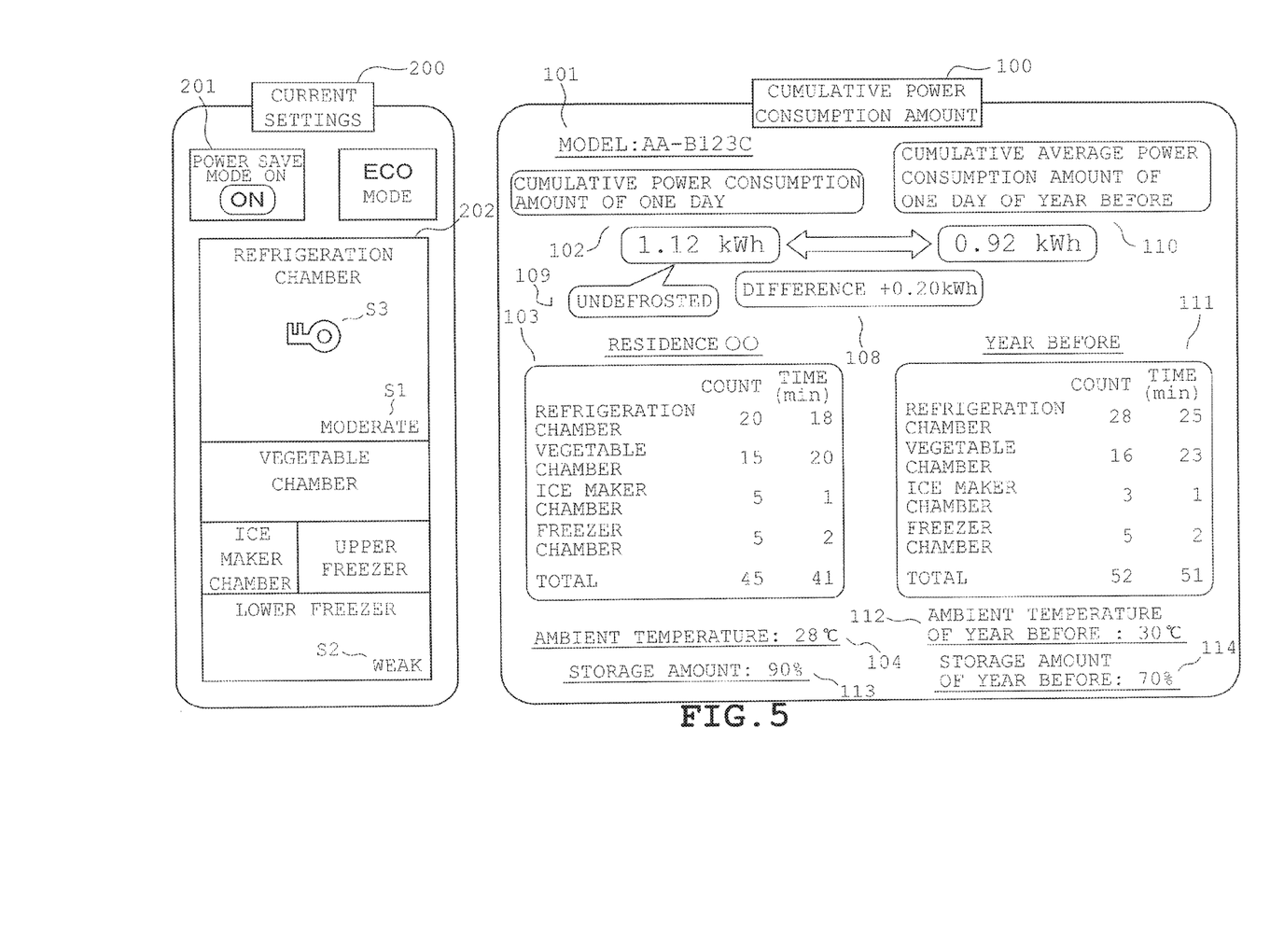
FIG. 5 illustrates one example of an output screen of the power consumption output device.

In the example illustrated in FIG. 5, the power consumption display section 100 is provided with a past power consumption block 110 instead of the average power consumption block 105 described above. The past power consumption block 110 displays power consumption of the refrigerator 1 at a prescribed period prior to the present as a reference value. For example, the power consumption of the refrigerator 1 at 1 year from the present is displayed in the unit of "kWh" to the past power consumption block 111 to provide information in the same time of year in the past year.

The power consumption display section 100 is provided with a past operational status block 111 instead of the average operational status block 106. The past operational status block 111 displays the operational status of the refrigerator 1 at a prescribed period prior to the present. In this example, the operational status of the refrigerator 1 at 1 year from the present is displayed to the past operational status block 111 to provide information in the same time of year in the past year.

The power consumption display section 100 is provided with a past ambient temperature block 112 instead of the average ambient temperature block 107. The past ambient temperature block 112 displays the ambient temperature of the refrigerator 1 at a prescribed period prior to the present. For example, the ambient temperature of the refrigerator 1 at 1 year from the present is displayed to the past ambient temperature block 112 to provide information in the same time of year in the past year.

The power consumption display section 100 is further provided with a storage amount display block 113 which displays the current amount of storage of the refrigerator 1. The power consumption display section 100 is further provided with a past storage amount display block 114 which displays the amount of storage of at a prescribed period prior to the present. For example, the amount of storage of the refrigerator 1 at 1 year from the present is displayed to the past storage amount display block 114 to provide information in the same time of year in the past year.

Figure 6:
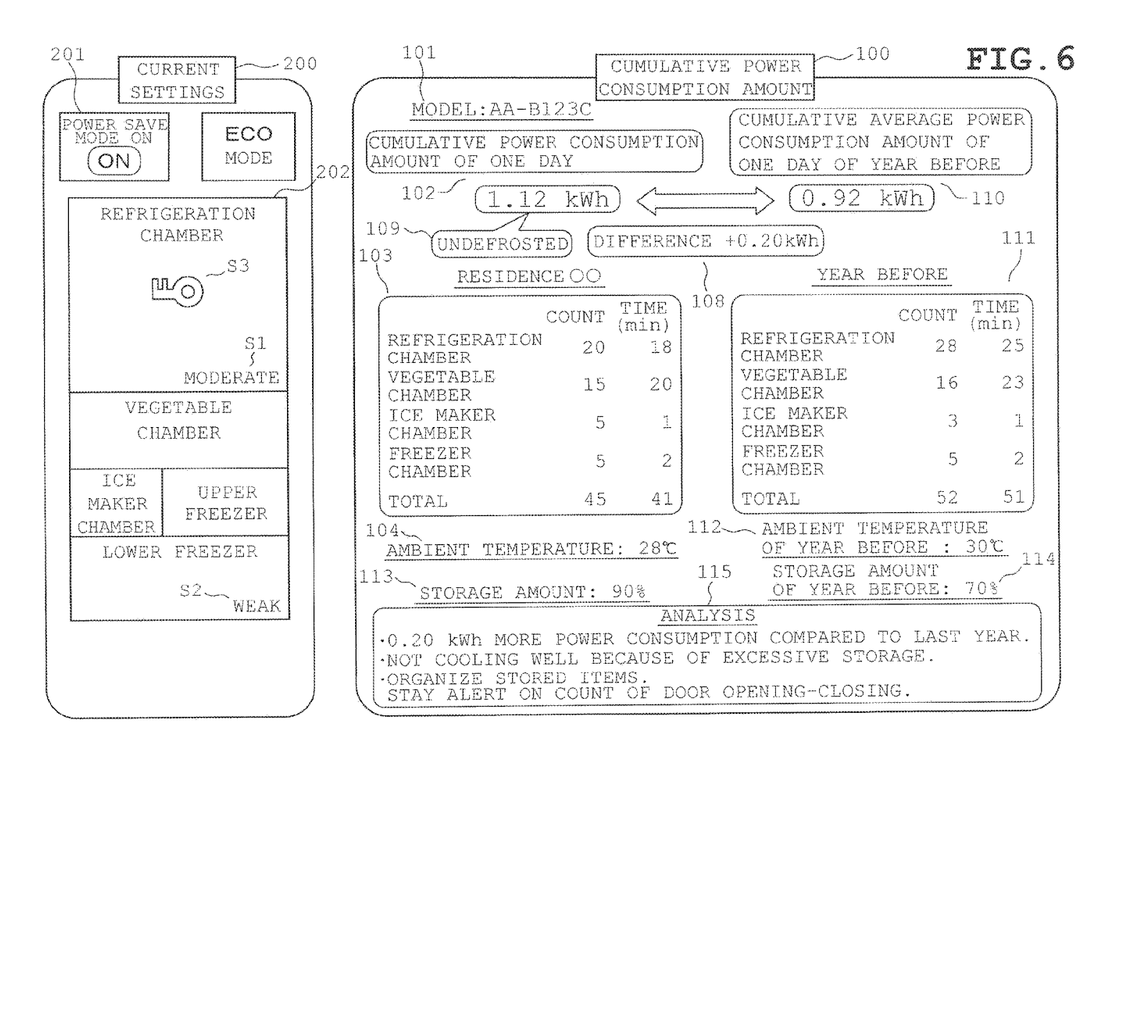
FIG. 6 illustrates one example of an output screen of the power consumption output device.

In the example illustrated in FIG. 6, the power consumption display section 100 is further provided with an analysis block 115. The analysis block 115 displays insights on the cause of change in power consumption and tips on measures to be taken based on the message data produced depending upon the analysis provided by the analyzing portion.

Figure 7:
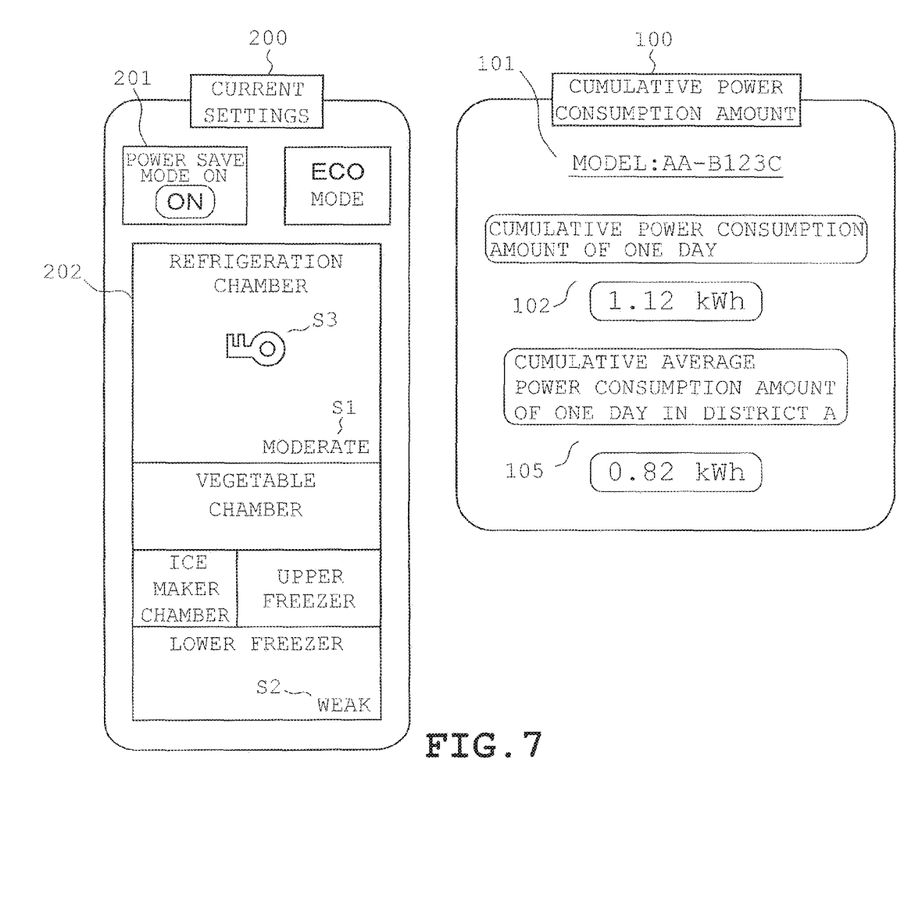
FIG. 7 illustrates one example of an output screen of the power consumption output device.

In the example illustrated in FIG. 7, the power consumption display section 100 is provided with the model block 101, the power consumption block 102, and the average power consumption block 105. In the example illustrated in FIG. 7, the current power consumption of the refrigerator 1 is displayed with the reference value. The power consumption output screen of the information output device 4 may be modified as required from the examples given above. For example, the layout of the power consumption output screen of the information output device 4 maybe switched by user operation made through the operation input portion 31.

The power consumption output device 4 of one embodiment is configured to acquire power consumption information indicating the current power consumption of the home appliance which, in this example, is refrigerator 1 when required. The power consumption output device 4 further displays the power consumption of the refrigerator 1 along with a reference value obtained based on the acquired power consumption information. It is thus, possible for the user to readily judge the appropriateness of the current power consumption of the refrigerator 1 through comparison with the reference value. This effectively improves the energy saving mindset of the user.

The power consumption output device 4 is further configured to accumulate the power consumption indicated in the power consumption information acquired from the refrigerator 1 from time to time within the prescribed time period from the present and output the cumulative power consumption along with a reference value. It is thus, possible for the user to readily judge the appropriateness of the current power consumption of the refrigerator 1 through comparison with the cumulative power consumption of the refrigerator 1 within the prescribed time period prior to the present.

The power consumption output device 4 is further configured to accumulate the power consumption indicated in the power consumption information acquired from the refrigerator 1 in the day before and output the cumulative power consumption along with a reference value. It is thus, possible for the user to readily judge the appropriateness of the current power consumption of the refrigerator 1 through comparison with the cumulative power consumption of the refrigerator 1 in the day before.

The power consumption output device 4 is further configured to acquire power consumption information from multiple refrigerators. The power consumption output device 4 sets the average power consumption of the group of multiple refrigerators, obtained from the acquired multiple pieces of power consumption information, as a reference value. It is thus, possible for the user to readily judge the appropriateness of the cumulative power consumption of the refrigerator 1 through comparison with the average power consumption level.

The power consumption output device 4 is further configured to acquire power consumption information from multiple refrigerators and calculate the average power consumption for each of multiple groups of refrigerators classified by model. It is thus, possible for the user to readily judge the appropriateness of the cumulative power consumption of the refrigerator 1 through comparison with the power consumption of the group of refrigerators of the same model as the refrigerator 1 since good basis of judgement is provided through comparison with refrigerators having the same performance level.

The power consumption output device 4 is further configured to calculate an average value for multiple home appliances located in the same region as the refrigerator 1. It is thus, possible for the user to readily judge the appropriateness of the cumulative power consumption of the refrigerator 1 through comparison with the power consumption of refrigerators located in the same region where the environment is substantially the same, since good basis of judgement is provided through comparison with refrigerators being subjected to similar environment.

The power consumption output device 4 is further configured to set the power consumption indicated in the power consumption information acquired from the refrigerator 1 at a predetermined time period of, for example, 1 year from the present as the reference value. It is thus, possible for the user to readily judge the appropriateness of the cumulative power consumption of the refrigerator 1 through comparison with the power consumption of the refrigerator 1 in the same time of year in the year before, since good basis of judgement is provided through comparison with power consumption resulting from similar climate.

The power consumption output device 4 is further configured to be capable of modifying the reference value based on the ambient temperature. It is thus, possible to set a more appropriate reference value.

The power consumption output device 4 is further configured to output the operational status of the refrigerator 1 based on the operational status information acquired from the refrigerator 1 along with the power consumption and the reference value. It is thus, possible for the user to judge the appropriateness of the cumulative power consumption of the refrigerator 1 taking the operational status into consideration. The operational status of the refrigerator 1 includes various operational status of the refrigerator such as the presence/absence of defrost operation of the cooler, count of door opening-closing, time of door opening-closing, temperature around the refrigerator 1, and amount of food stored in the fridge.

The power consumption output device 4 is further configured to display the power consumption in the unit of "kWh". It is possible to make the level of power consumption to be more noticeable to the user by displaying the power consumption in a unit which is familiar to the user.

The power consumption output device 4 is further configured to analyze the cause of change in power consumption to be displayed and display the analysis. It is thus, possible for the user to readily be aware of the cause of the change in power consumption and easily cope with such change.

The embodiments described above may be modified or expanded as described below.

The power consumption output device 4 may be provided with a sound output device such as a speaker and output power consumption and reference value by sound instead of or with visual display.

The information output device 4 may be configured to indicate power consumption and reference value by a rating of levels represented by number of marks such as stars and light bulbs. The information output device 4 maybe further configured to indicate power consumption and reference value by converting them into electricity bills.

The refrigerator 1 may be provided with a deodorizer configured to deodorize the room by applying high voltage and electrostatic atomizer configured to produce water vapor into the vegetable chamber in addition to the defroster 16 and the ice maker 17. The home appliance includes various types such as a washing machine and a heat cooker besides a refrigerator given above as an example.

A power consumption output device of one embodiment is provided with a power consumption information acquiring unit and an output unit. The power consumption information acquiring unit is configured to acquire power consumption information indicating power consumption of a home appliance. The output unit is configured to output power consumption of the home appliance acquired based on the power consumption information acquired by the power consumption information acquiring unit along with a reference value. It is thus, possible for the user to readily judge the appropriateness of the power consumption of the home appliance through comparison with the reference value and thereby effectively improve the user's energy saving mindset.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power consumption output device comprising:
    a power consumption information acquiring unit configured to acquire power consumption information indicating power consumption of a home appliance;
    an output unit configured to output the power consumption of the home appliance along with a reference value of power consumption, the power consumption of the home appliance being obtained based on the power consumption information acquired by the power consumption information acquiring unit;
    a reference value setting unit configured to set the reference value;
    a reference value modifying unit configured to modify the reference value set by the reference value setting unit; and
    an output screen configured to:
        provide a power consumption display section displaying the power consumption of the home appliance and the reference value; and
        provide an applied settings display section displaying settings applied to the home appliance.

2. The power consumption output device according to claim 1, wherein the output unit is configured to accumulate power consumption indicated in the power consumption information acquired by the power consumption information acquiring unit within a prescribed period prior to the present and output a cumulative power consumption along with the reference value.

3. The power consumption output device according to claim 1, wherein the output unit is configured to accumulate power consumption indicated in the power consumption information acquired by the power consumption information acquiring unit one day before the present and output a cumulative power consumption along with the reference value.

4. The power consumption output device according to claim 1,
    wherein the power consumption information acquiring unit is configured to acquire multiple pieces of the power consumption information from multiple home appliances, and
    wherein the reference value setting unit is configured to set an average power consumption of the home appliances as the reference value based on the multiple pieces of the power consumption information acquired by the power consumption information acquiring unit.

5. The power consumption output device according to claim 4, wherein the reference value setting unit is configured to calculate the average power consumption for the home appliances of the same model.

6. The power consumption output device according to claim 4, wherein the reference value setting unit is configured to calculate the average power consumption for the home appliances located in a prescribed region.

7. The power consumption output device according to claim 1,
    wherein the reference value setting unit is configured to set power consumption indicated in the power consumption information acquired a prescribed time period before the present by the power consumption information acquiring unit as the reference value.

8. The power consumption output device according to claim 4, further comprising an ambient temperature detecting unit configured to detect ambient temperature,
    wherein the reference value modifying unit is configured to modify the reference value set by the reference value setting unit based on the ambient temperature detected by the ambient temperature detecting unit.

9. The power consumption output device according to claim 1, further comprising an operational status acquiring unit configured to acquire operational status information indicating an operational status of the home appliance,
    wherein the output unit is configured to display the operational status of the home appliance along with the power consumption and the reference value based on the operational status information acquired by the operational status information acquiring unit.

10. The power consumption output device according to claim 9, wherein the home appliance is a refrigerator provided with a cooler and the operational status information acquiring unit is configured to acquire, as the operational status information, defrost history information indicating presence and absence of execution of a defrost operation in the cooler of the refrigerator.

11. The power consumption output device according to claim 9, wherein the home appliance is a refrigerator provided with a door and the operational status information acquiring unit is configured to acquire, as the operational status information, door opening-closing count information indicating a count of times in which the door was opened and closed.

12. The power consumption output device according to claim 9, wherein the home appliance is a refrigerator provided with a door and the operational status information acquiring unit is configured to acquire, as the operational status information, door opening-closing time information indicating a time expended on opening and closing the door.

13. The power consumption output device according to claim 9, wherein the home appliance is a refrigerator provided with a peripheral temperature detecting unit configured to detect temperature around the refrigerator, and the operational status information acquiring unit is configured to acquire, as the operational status information, peripheral temperature information indicating the temperature around the refrigerator detected by the peripheral temperature detecting unit.

14. The power consumption output device according to claim 9, wherein the home appliance is a refrigerator provided with a storage amount detecting unit configured to detect amount of food stored in the refrigerator, and the operational status information acquiring unit is configured to acquire, as the operational status information, storage amount information indicating the amount of food stored in the refrigerator detected by the storage amount detecting unit.

15. The power consumption output device according to claim 1, wherein the power consumption displayed by the display unit is displayed in a unit of kWh.

16. The power consumption output device according to claim 1, further comprising an analyzing unit configured to analyze a cause of change observed in the power consumption detected by the output unit.

* * * * *